2,903,963
SPIRIT DUPLICATING MACHINES

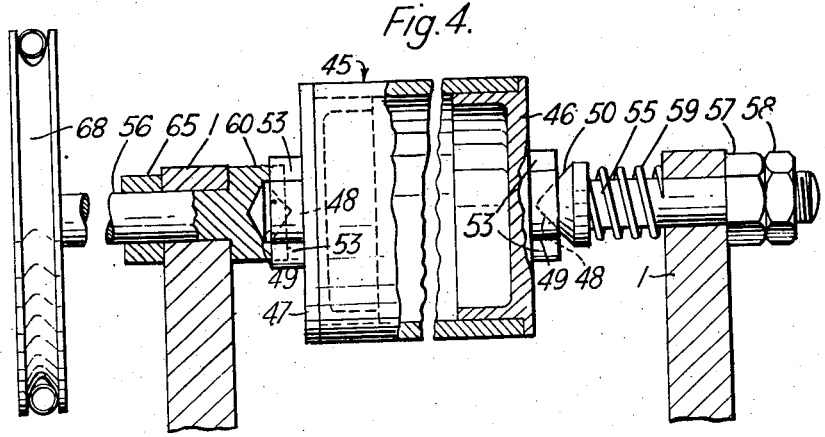
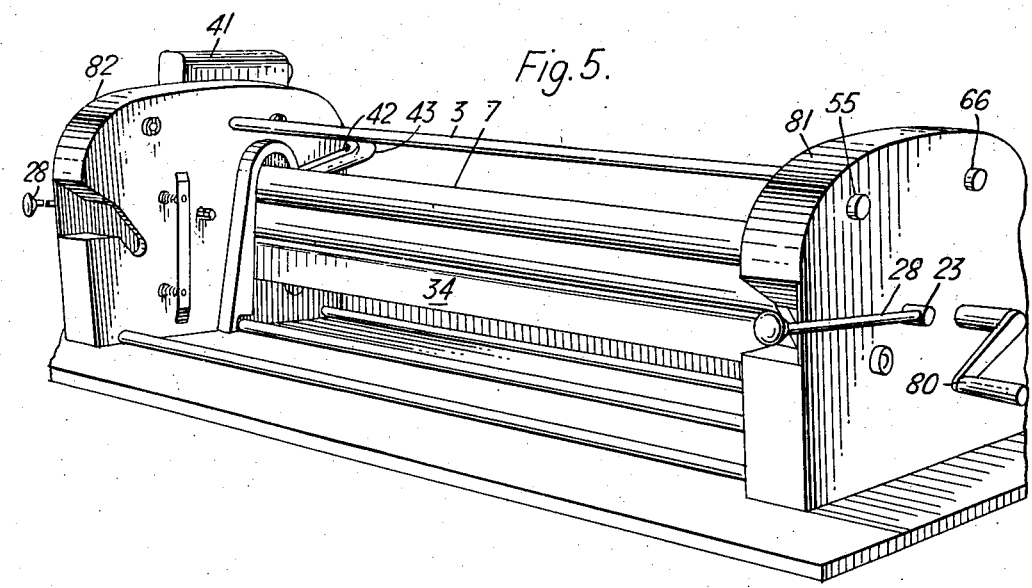

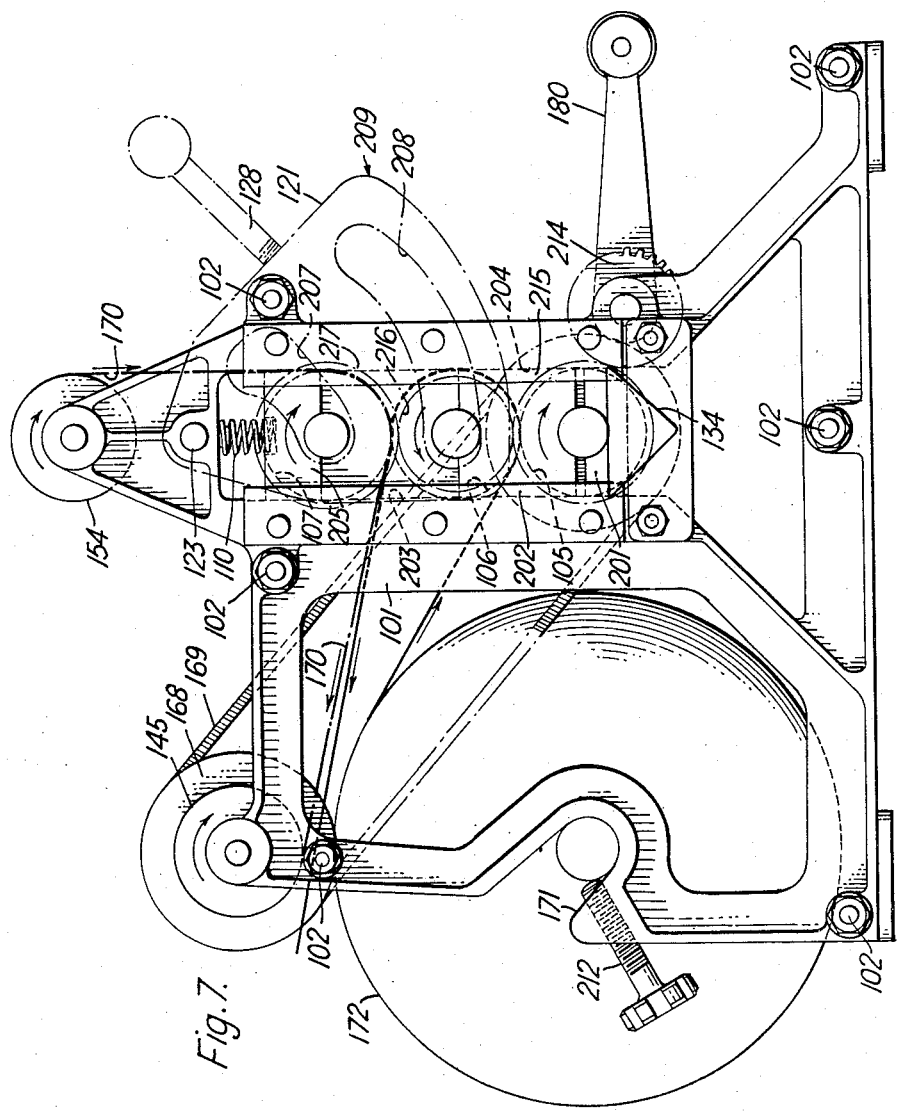

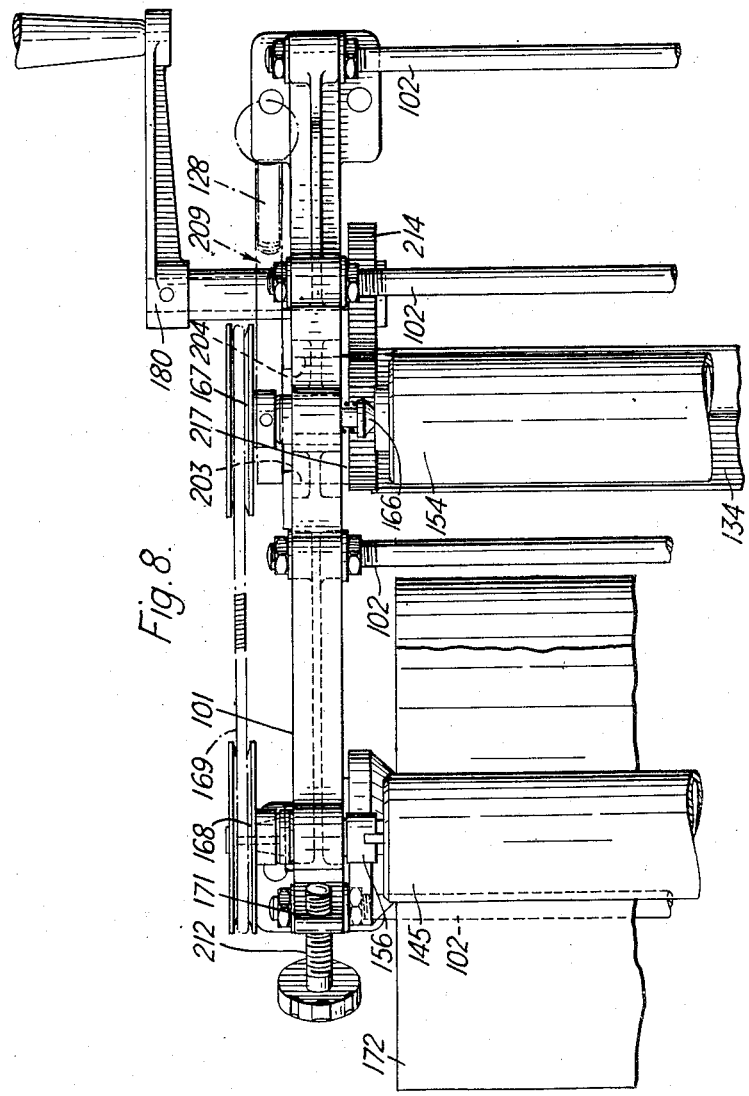

Norman Harris and Morris Bryer, Westcliff-on-Sea, England, assignors to Juno Machinery Limited, Southend-on-Sea, England, a British company Application January 13, 1958, Serial No. 708,454

Claims priority, application Great Britain May 16, 1957

5 Claims. (Cl. 101—132.5)

This invention relates to a spirit duplicating machine, and particularly to a machine for producing markers or duplicate copies for master copies of any desired length. It is particularly, but not exclusively concerned with a machine for making markers for the garment trade.

In spirit duplication a pattern which it is desired to copy is marked on a sheet of paper or other suitable surface using a dye so as to produce a master copy of the pattern, and a print or marker is made from the master copy by bringing the master copy into contact with a sheet of paper or the like which has been moistened with a spirit, the spirit serving to dissolve some of the dye and thereby to transfer a mirror image of the pattern onto the marker paper.

Hitherto, the most general method of making a marker or print in a spirit duplicating machine has been to mount the master copy round the circumference of a drum and then to rotate the drum in contact with a flat sheet of marker paper moistened with spirit so as to drive the sheet forwards and simultaneously transfer a print of the master copy onto the marker paper.

In the garment trade, patterns or markers are of widely varying lengths and are often of a length which is too great to be produced by known spirit duplicating machines, i.e. they are larger than the circumference of the drum round which the master copy is usually mounted. Hitherto, the method that has been adopted in the dress trade for making markers involved the use of several sheets of carbon paper interspersed between sheets of marker paper. However, owing to the cumulative thickness of the carbon paper and marker paper, generally only seven satisfactorily clear markers could be obtained by these means. Furtheermore, this method produced spare markers which had to be stored until they were required, and this led to the necessity of providing storage for them. Furthermore, this method is lengthy and therefore costly particularly when further markers for a small number of garments only have to be produced.

It is one object of the present invention to provide a spirit duplicating machine by means of which it is possible to produce a large number of markers quickly from a master copy which is of any desired length. The nature of a spirit duplicating machine makes it possible to produce the exact number of markers that are required, so that there is no necessity to provide storage space other than for the master copies.

According to the invention, therefore, there is provided a spirit duplicating machine comprising two rotatably mounted rollers adapted to coact with one another, drive means for said rollers, means for moistening a strip of marker paper with spirit, and a feed spool and a take-up spool whose axes are parallel to the axis of said rollers, the take-up spool serving in operation to wind on a master copy after it has been unwound from the feed spool and fed in contact with the moistened marker paper between said rollers.

The master copy is produced in known manner as for former spirit duplicating machines, e.g. by means of hectographic or other suitable carbon or copying paper, or with a copying pencil.

In some establishments where a large number of markers are constantly being required, it may be advantageous to use large rolls of marker paper which, owing to their weight, are best mounted a short distance away from the machine in strong bearings. Preferably, however, the machine comprises means for mounting a roll of marker paper rotatably and removably in the machine itself.

The said rollers, which are surfaced with rubber or like material, will in operation, cooperate to apply substantially uniform pressure to a marker paper and a master copy passing between them. This interaction of the rollers will ensure that their circumferential speeds are substantially identical. However, slip may occur and it may be advantageous to provide means whereby this possibility is eliminated. Similarly, it is preferred to provide means for the take-up spool so that it is adapted to rotate at a circumferential speed which is slightly greater than that of the rollers. The driving interconnection may be achieved for example, by gearing, belt drive or chain drive.

Any convenient means for moistening the marker paper so as to give it an even coating of spirit may be used, but preferably a moistening wheel is used which coacts with one of said rollers round which marker paper passes so as to moisten substantially the whole width of the marker paper, the moistening wheel being adapted to rotate with its lower surface below the level of spirit in a trough.

It will be appreciated that there are many different ways in which the rollers and spools may be arranged, but for ease of production and compactness of the machines, preferably the rollers are mounted with their axes in a vertical plane above the moistening wheel, and the feed spool is mounted with its axis above the upper roller. Also for compactness, the roll of marker paper is mounted close to this plane, with the take-up spool above it leaving sufficient clearance between the top of the roll and the bottom of the take-up spool through which the printed marker paper may be withdrawn. With this arrangement, it will be seen that in order for the moistening wheel to coact with one of the rollers round which the marker paper passes, the marker paper must pass round the lower roller.

The spools may be permanently mounted in the machine, but the machine can be set up more quickly if they are removably mounted as is preferred. Preferably a take-up spool mounting is used similar to those in photographic cameras, in which one end of the take-up spool is adapted to fit into a slotted non-slip coupling member which is rotatably mounted in the frame of the machine, and the other into a stub axle or spigot which is spring loaded so that it can be displaced to release the spool when required. Drive from the above mentioned gearing, belt drive or chain drive can be transmitted through the non-slip coupling to rotate the take-up spool to cause it to wind on the master copy.

For the sake of uniformity, preferably the take-up spool is so designed that at each end, it can fit into a slotted non-slip coupling member or a stub axle. When the feed spool is identical with the take-up spool, which is preferred, the feed spool mounting can be substantially the same as that for the take-up spool, with a slotted non-slip coupling member being rotatably mounted in the same frame of the machine as the coupling member for the take-up spool. A restraint mechanism for the feed spool can be mounted on the coupling member for the feed spool.

It is preferred to provide means for separating the rollers from one another, and from the moistening wheel, so that the machine can be set up quickly, i.e. with the marker paper and master copy central with respect to the rollers, and with their longitudinal axes at right angles to the axes of the rollers. Also, when the machine is not in use, the rollers and moistening wheel can be separated to avoid distorting them and to facilitate cleaning.

Any suitable method of separating the rollers and moistening wheel from each other may be used, and, for example, in one embodiment, it is preferred to mount the spindles of the rollers in slots which laterally locate the spindles but allow vertical movement of the spindles in the slots. Beneath the projecting ends of the spindles of the rollers at each side of the machine, two cam arms are arranged which are so pivotally mounted that the weight of the rollers tends to close the remote ends of each pair of cam arms together. A rotatable cam plate is disposed between the remote ends of each pair of cam arms, which is so shaped that when it is rotated, the associated cam arms separate and cause the spindles of the rollers to move so that the rollers and moistening wheel became spaced from each other.

In another embodiment of the invention, an alternative method of separating the rollers and moistening wheel from each other is to mount the spindles of the rollers in bearings which are movable in a bearing frame, and to arrange a pivotally mounted cam frame with the ends of the spindles projecting on either side into arcuate cam slots in the cam frame. It is possible to impart selectivity to the action of the cam frame by so shaping the arcuate slots that on first moving the cam frame when the rollers and moistening wheel coact, the rollers only are separated, and that on further movement of the cam frame, the rollers are left separated and the moistening wheel is separated from the roller with which it coacts.

It may be advantageous to produce a guide roller for the marker paper which is rotatably mounted parallel to and at the same horizontal level as the lower roller, the lower roller and the guide roller having the same diameter so that moistened marker paper may pass from between the lower roller and the moistening wheel, round the guide roller, and back between the lower and upper rollers making its first contact with these two rollers substantially at the line of contact of the two rollers.

There will now be described by way of example only two preferred embodiments of the invention with reference to the accompanying drawings in which:

Fig. 4 is a section on line 4—4 of Fig. 3 and shows the take-up spool;

Fig. 5 is a perspective view of the front of a machine of the type shown in Fig. 1 provided with cover plates;

Fig. 7 is a side elevation of another embodiment according to the invention; and Fig. 8 is a plan view of part only of the embodiment of Fig. 7 and shows the gearing and driving handle.

Figure 1:
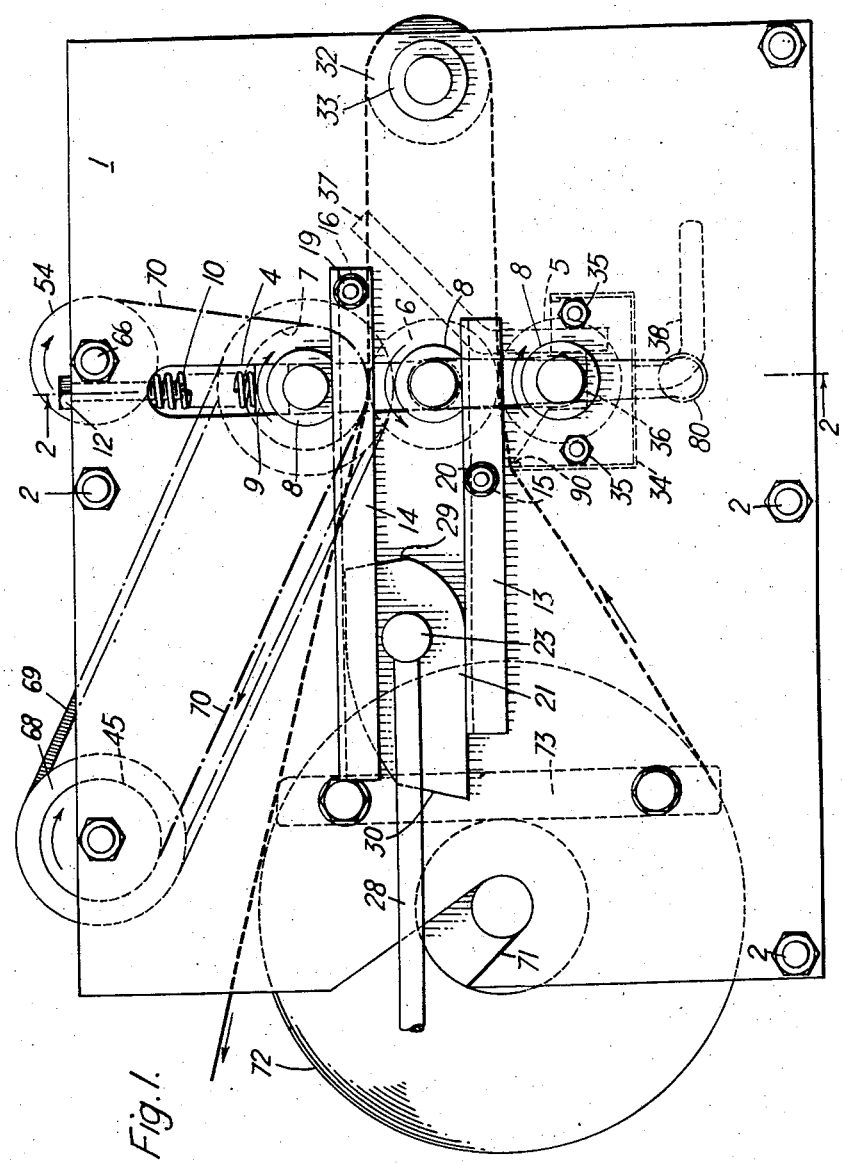
Fig. 1 is a side elevation of a spirit duplicating machine suitable for producing markers of up to 40 inches in width, without any cover plates and from which the drive handle for the rollers has been removed for simplicity.

A spirit duplicating machine according to the invention has two opposite vertical rigid bearing frames 1 which are secured together by tie bars 2 surrounded by tubular spacers 3. In each of the bearing frames 1 there is a vertical slot 4 having parallel sides and semi-circular ends. The vertical slots 4 serve to locate laterally spindles of a bottom moistening wheel 5, a lower roller 6 and an upper roller 7, said spindles being rotatable in the vertical slots 4 and free to move vertically therein. The rollers 6, 7 are surfaced with rubber or like material, and longitudinal movement of the rollers and moistening wheel in the slots 4 is prevented by means of collars 8 which are secured to the spindles by means of grub screws (not shown). On the upper roller 7, two collars 8 are provided at each end of the spindle which collars are respectively disposed adjacent the inner and outer surfaces of the bearing frames 1. A bearing shoe 9 which has the same thickness as the bearing frames 1 and is slightly shorter in width than the slots 4, is located in each of the slots 4 above the spindle of the upper roller 7 and is held in place by the collars 8 at each end of the spindle. The rollers 6, 7 and moistening wheel 5 are urged into contact with one another by compression springs 10 disposed in the upper ends of the slots 4, each spring 10 being located in its slot at the lower end of the spring by the head of a bolt 11 threaded into the bearing shoe 9, and at the upper end by the part of a bolt 12 threaded downwards from the top of the bearing frame 1 and projecting into the slot 4.

This particular arrangement of the moistening wheel 5 and rollers 6, 7 is advantageous because the weight of the two rollers is effective in determining the total pressure between the lower roller 6 and the moistening wheel 5, with the result that in operation excess spirit on the moistening wheel and the marker paper passing between the moistening wheel 5 and the lower roller 6 is effectively squeezed out on the "in" side of the wheel and rollers, so as to produce moistened but unflooded marker paper.

Furthermore, the rollers 6, 7 and moistening wheel 5 will automatically readjust themselves in the vertical slots 4 in the bearing frames 1 consequent on any wear of the rollers or wheel.

Spaced from the outer surface of each of the bearing frames 1, a pair of cam arms 13, 14 are pivotally mounted on stub shafts 15, 16. The cam arms 13, 14 have an L-shaped cross section, and the stub shaft 15, 16 have a stepped portion at each end which enables the stub shafts to be secured to the bearing frames 1, and the cam arms to be held in place on the stub shafts whilst leaving sufficient clearance to allow the came arms 13, 14 to move freely thereon. The securing of the stub shafts to the bearing frames 1 is achieved by a spring washer 17 and a nut 18 threaded onto each stub shaft, and a similar spring washer and nut is used to hold the cam arms in place.

The cam arms 13, 14 extend towards the front end of the machine i.e. the left hand side of Fig. 1, the upper cam arms 14 being pivoted about an axis 19 extending across the machine on the right of the vertical slot 4 shown in Fig. 1 whilst the lower cam arms 13 are pivoted about an axis 20 on the left of the vertical slot 4.

Figure 2:
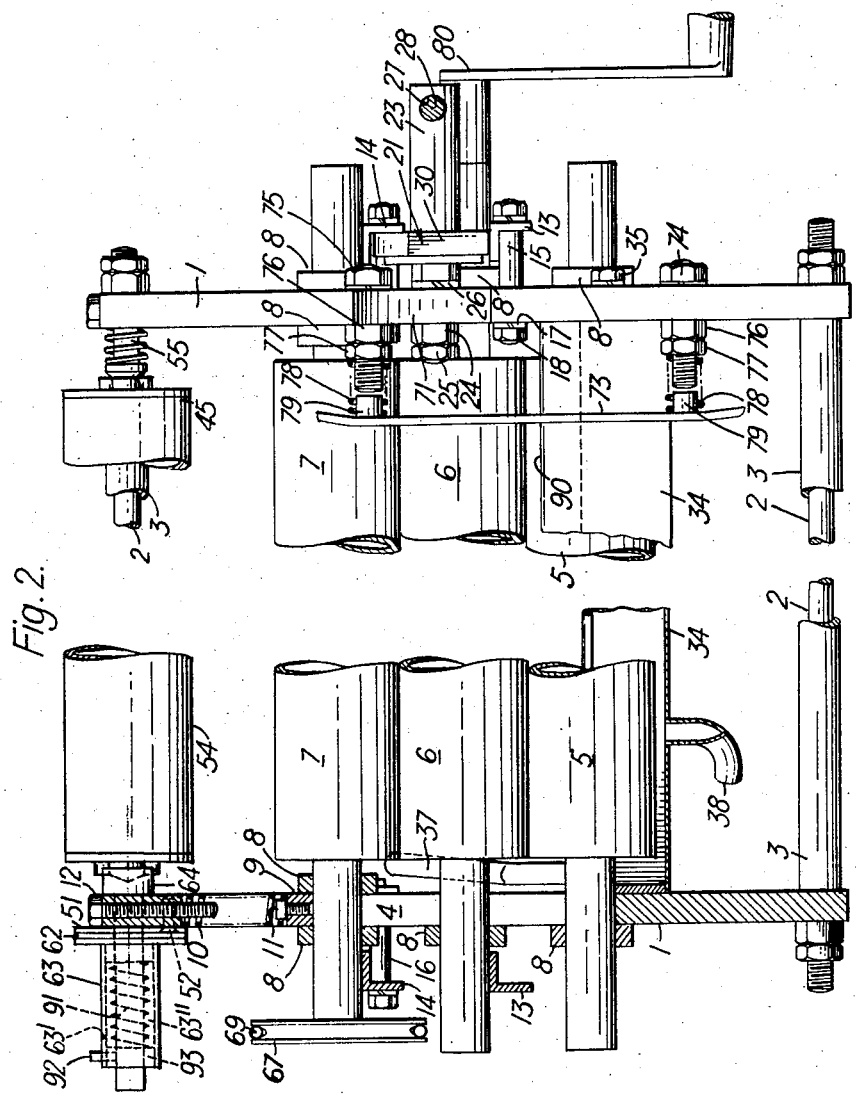
Fig. 2 is an end elevation of the machine shown in Fig. 1, the left hand portion being a section on line 2—2 of Fig. 1.

A cam plate 21 is located in a vertical plane parallel to each bearing frame 1 at each side of the machine and extends between the horizontal parts of the cam arms 13, 14 as shown in Fig. 2. Each cam plate 21 is secured to a collar 22 integral with a stub shaft 23 by screws (not shown), the stub shaft 23 being provided with stepped portions so that it can be pivotally secured to the respective bearing frame 1 of the machine e.g. by means of nut 24 and lock nut 25. A spring washer 26 prevents unrestricted movement of the stub shaft.

At the outer end of each stub shaft 23, a threaded hole 27 is provided into which a cam control lever 28 can be threaded, the control levers 28 extending beyond the front end of the machine. When the cam plates are in the position indicated in Fig. 1, the cam arms 13, 14, and control levers 28 are substantially horizontal, and there is a small clearance between the cam arms 13, 14 and the bottoms of the spindles of the two rollers 6, 7 which project outwardly from the bearing frame 1.

If the cam levers 28 are rotated clockwise in the view shown in Fig. 1, until the flats 29 and 30 on the cam plates 21 come into contact with the cam arms 13, 14, the cam plates 21 will be in a stable position and the effect of rotation will have been to raise the spindles of the two rollers 6, 7, so that the lower roller 6 is out of contact with the moistening wheel 5, and the upper roller 7 is separated from the lower roller 6.

At the rear end of the machine, a guide roller 32 having the same diameter as the lower roller 6 is mounted between the bearing frames 1 of the machine with its axis parallel to and at the same horizontal level as the axis of the lower roller 6 when it is in contact with the moistening wheel 5. This roller 32 is retained in position by brushes 33 which are locked on the spindle of the guide roller by means of grub screws (not shown). The presence and position of this guide roller 32 are important as will be explained hereinafter.

Beneath the moistening wheel 5, a U-shaped horizontal trough 34 is arranged which is secured to the bearing frames 1 by nuts and bolts 35. The lateral end faces of the trough 34 have a cut-away portion 36 through which the spindle of the moistening wheel 5 can project. As shown in Fig. 2, two tubes 37, 38 are connected to the trough 34, tube 38 being connected to the bottom of the trough whilst tube 37 is connected to the side of the trough with its lower end positioned above the bottom of the trough 34 at the level at which it is desired to maintain the spirit. If necessary, this level could be varied by mounting tube 37 so that its height could be varied in the machine, instead of securing it to the trough.

The two tubes 37 and 38 are connected to two tubes 39 and 40 of tank 41 (see Fig. 6) by means of flexible tubing 42, 43 such as polythene tubing. The polythene tubing 42, 43 has a diameter which ensures that an airtight seal is made with the tubes to which it is connected, and which also ensures that the spirit trough 34 is filled reasonably quickly when the machine is first being prepared for use. It has been found advantageous to use tubing of different internal diameters for the two tubes, e.g. tube 43 having an internal diameter of approximately ⅜ of an inch, and tube 42 an internal diameter of approximately 5/16 of an inch. The tank 41 is provided with a sealing cap 44, which when screwed into place, provides an airtight seal for the tank.

In Fig. 4, there is shown a take-up spool 45 constructed from rigid tubing and two identical end plates 46, 47 in conventional manner. On end plates 46, 47, there is provided a centre spot 48 in a boss 49 for receiving a centre pin, and from the circumference of boss 49, two diametrically opposed lugs 53 project radially.

A feed spool 54 which is not shown in detail but is of identical construction to the take-up spool, is mounted between the bearing frames 1 as shown in Fig. 1.

Referring again to Fig. 4, the take-up spool 45 is mounted between the bearing frames 1 of the machine by means of a centre pin 55 and a dog pin 56. The centre pin 55 can move longitudinally in the bearing frame and an adjusting nut 57 and a lock nut 58 are threaded onto the outer end of the shaft of the centre pin. The point 50 of the centre pin is urged away from the bearing frame 1 by means of a compression spring 59.

Figure 3:
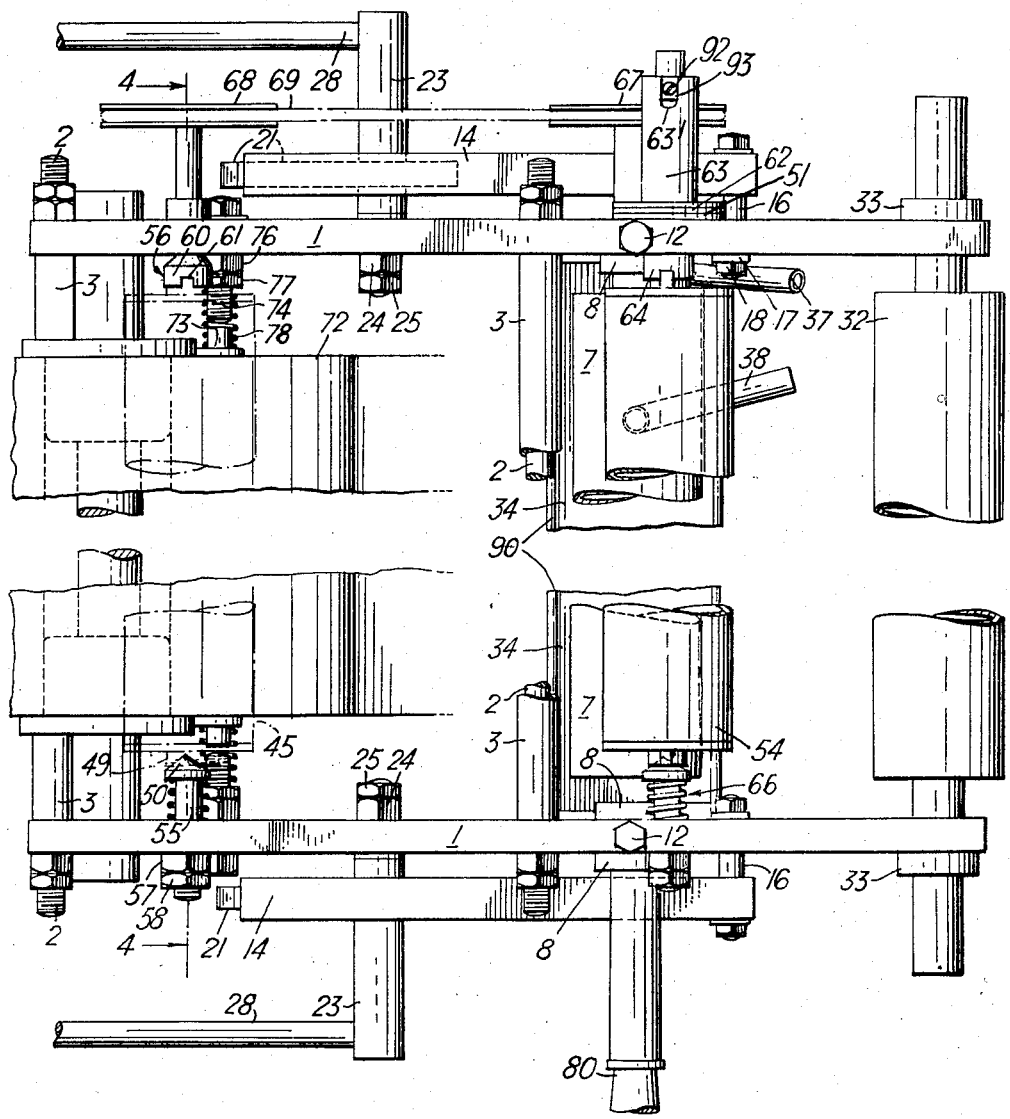
Fig. 3 is a plan view of Fig. 1.

The dog pin 56 is provided with a collar 60 in which diametrical notches 61 are formed, as best shown in Fig. 3. When the dog pin 56 engages end plate 47, the lugs 53 on the end plate fit into the notches 61 and the boss 49 on the end plate 47 fits into the collar 60 on the dog pin 56 so as to locate and centre the end of the take-up spool 45. The dog pin 56 is rotatably mounted in bearing frame 1 and is axially located by a bush 65 which is locked in place on the shaft of the dog pin by a grub screw (not shown).

At the rear end of the machine and at the same horizontal level as the spool supporting means for the take-up spool 45, a spring loaded centre pin 66 and a rotatable dog pin 64 are provided of a construction similar to the centre pin 55 and dog pin 56 shown in Fig. 4. The centre pin 66 and dog pin 64 serve in operation to support and locate the feed spool 54.

A restraint mechanism for the feed spool is mounted on the shaft of dog pin 64. It comprises a disc 51 secured to frame 1 by a countersunk bolt 52, a friction disc 62, and a backing member 63 which is urged against the friction disc 62 by collar 93 bearing against spring 91 which is disposed in space 63$^{11}$ of the backing member 63. The collar 93 is locked on the shaft of dog pin 64 by a grup screw 92 which projects through slot 63$^1$ in the backing member 63. The tension in spring 91 can be adjusted by adjusting the position of the collar 93.

Mounted on the shafts of the upper roller 7 and the dog pin 56 which protrude through the left hand bearing frame 1 (see Figs. 2 and 4) are pulleys 67 and 68 locked in place by means of grub screws (not shown). The pulley 68 has a slightly smaller diameter than pulley 67 and the pulleys are drivingly interconnected by means of a taut closely-coiled spring belt 69 held in place in the grooves of the pulleys. The take-up spool 45 and the roller 7 have the same diameter, so that the pulley drive tends to impart a circumferential speed to the take-up spool 45 greater than the circumferential speed of roller 7. This ensures that before duplication commences from a master copy 70 which is unrolled from feed spool 54 and onto the take-up spool 45 after passing round the roller 7, as will be explained more fully hereinafter, any initial slack in the master copy will be taken up quickly. Further it will be apparent that as the master copy is wound onto the take-up spool 45, the effective diameter of the take-up spool will increase tending to cause the master copy to be wound thereon at a successively increasing speed. In both these cases, the result would be to cause the master copy to stretch and maybe even break if no slip can occur in the drive between the take-up spool 45 and the upper roller 7. For this reason, instead of a gear mechanism or a chain drive, a pulley and spring belt drive is used which allows slip to take place when the tension in the master copy 70 reaches a certain value which must of course be below that value which would cause the master copy to tear.

At the front end of the machine, upwardly inclined U-shaped slots 71 are provided for receiving the spindle of a roll 72 of marker paper, and which locate the roll 72 so that its axis is parallel to the axes of the rollers 6, 7.

Free rotation of the roll of marker paper 72 is prevented by means of two vertical metal brake plates 73 releasably mounted respectively on the bearing frames 1. The mounting of each brake plate is effected by two bolts 74 and 75 which are locked in the bearing frames 1 by nuts 76 and locking nuts 77. Springs 78 are fitted onto the projecting ends of the bolts, the other ends of the springs making a press fit on bosses 79 secured to the rear face of each brake plate 73. The length of the springs 78 is such that they will cause the brake plates 73 to exert satisfactory pressure against a particular size of marker paper, different lengths of springs being provided for the different sizes of marker paper likely to be used.

Drive is transmitted to the machine by means of a handle 80 secured to the projecting spindle of the lower roller 6 (see Fig. 5).

Figure 6:
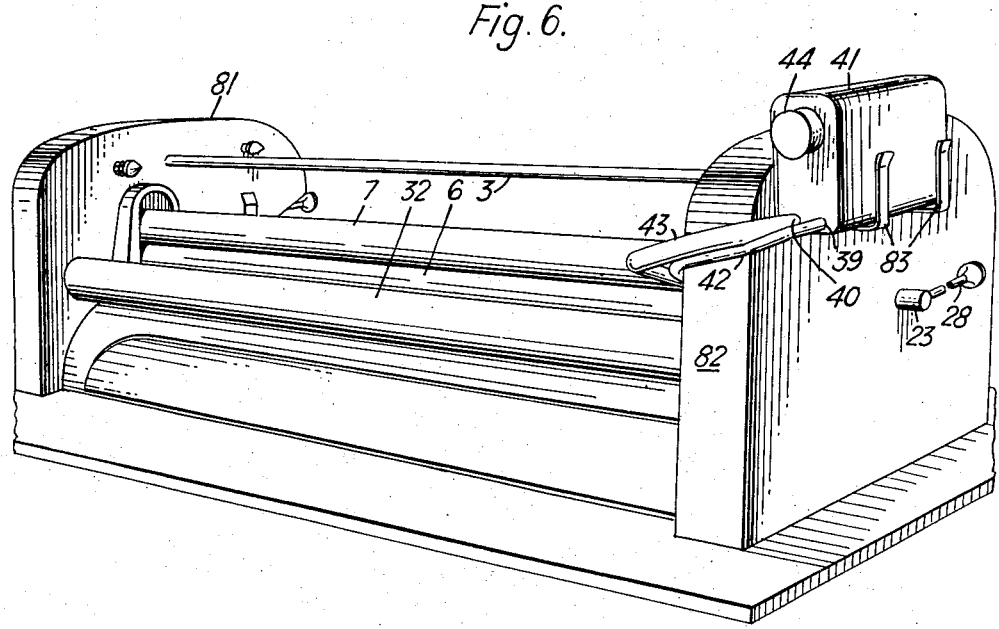
Fig. 6 is a perspective view of the rear end of the machine shown in Fig. 5.

The ends of the spindles of the rollers 6, 7 and moistening wheel 5, and the cam arms 13, 14 are preferably enclosed in cover plates 81, 82, as shown in Figs. 5 and 6, secured to each bearing frame 1. In this case, the ends of the spring loaded centre pins 55, 66 in the right hand bearing frame as shown in Fig. 2 extend through the side of the cover plate 81. Knobs (see Fig. 5) are threaded onto the end of the centre pins so that they may be manually withdrawn sideways into a position where the spools may be fitted quickly into place between the bearing frames 1. The cover plate 82 serves as a support for the spirit supply tank 41 which may be held in position above the level of the spirit trough 34 by means of spring clips 83 (Fig. 6).

A second embodiment of a spirit duplicating machine according to the invention will now be described with reference to Figs. 7 and 8. This machine which is generally similar to the one already described is suitable for use with marker paper which is of sufficient thickness to withstand creasing as the paper passes round the lower roller after it has been moistened with spirit.

The machine is provided with two opposite vertical bearing frames 101 secured together by tie bars 102. Adjacent the bottom of the bearing frames 101, the spindle of moistening wheel 105 is rotatably mounted in half-bearings 201, 202 of which 202 is vertically movable in slides 203, 204, in the bearing frames 101, the upper half-bearing 202 in each case serving also as a half bearing for a lower roller 106. An upper roller 107 is disposed above the lower roller, and since it is important that these rollers can always be arranged to exert a uniform pressure on the paper which in operation passes between them so that good quality prints can be obtained, no bearings are disposed between the spindles of the upper and lower rollers 107 and 106. Thus wear of the rollers will not affect the operation of the machine. The upper roller 107 is located by means of upper half-bearings 205, which are urged downwards in the slides 203, 204, by means of springs 110, thus urging the two rollers 106, 107 towards one another.

The ends of the spindles of the rollers project outwardly of the bearing frames 101 into arcuate cam slots 207, 208, provided in the two sides 121 of a pivotally mounted cam frame 209. The cam frame is pivoted in the frame of the machine about an axis 123 in the vertical plane containing the axes of the rollers, and parallel to such axes, and the arcuate slots 207, 208 are so shaped that in the position shown, the rollers 106, 107 and moistening wheel 105 coact, whilst in a second position, the rollers 106, 107 are separated, and in a third position when the cam frame 209 has been turned as far as it will go in a clockwise direction, the rollers are left separated, but the lower roller 106 is brought out of contact with the moistening wheel 105.

Beneath the moistening wheel, a V-shaped spirit trough 134 is arranged, so that when spirit is poured into the trough, it rises above the level of the lower surface of the moistening wheel. The sides of the spirit trough come into close proximity with the moistening wheel 105 to restrict evaporation from the trough as far as possible, and one end of the trough is provided with an extension 211 which projects a short distance beyond the frame of the machine, and by means of which spirit can be introduced into the trough 134, through a reservoir and a constant head device (not shown).

The rollers, moistening wheel and spools are the same diameter. Drive is transmitted to the machine by means of a handle mounted in the machine frame. A gear wheel 214 is keyed to the shaft of the handle which meshes with an identical gear wheel 215 keyed to the spindle of the moistening wheel 105, and then successively, the drive is transmitted to the rollers by means of further identical gear wheels 216 and 217.

The take-up spool 145 is constrained to rotate in the same direction and at the same speed as the moistening wheel 105 by a flexible belt drive 169 passing round two identical pulley wheels 167, 168 mounted respectively on the moistening wheel spindle 105, and the non-slip rotatably mounted coupling member 156 for the spool 145. The flexible belt 169 is disposed on the same side of the frame 101 of the machine as the drive handle 180.

The feed spool 154 and the take-up spool 145 are mounted in the machine in a similar manner to that described with reference to Figs. 1–5, except that two spring loaded centre pins 166 are provided for the feed spool. The roll of marker paper 672 is also disposed in U-shaped slots 171, and is prevented from leaving the slots by a threaded set screw 212. In this embodiment however, marker paper is fed from the top of the marker paper roll 172.

The operation of both machines is substantially similar, and so only one method of operation will be described with reference to the machine shown in Figs. 1–7.

In operation, the machine is mounted on a horizontal rigid support, and the spirit supply tank 41 is unclipped from the cover plate and turned so that the sealing cap 44 faces upwards. The sealing cap 44 is then unscrewed, spirit is poured into the tank, and the sealing cap is then re-screwed into position thereby sealing the spirit tank 41. On raising the tank and clipping it into place on the cover plate, spirit flows into the trough 34 up to the level of the bottom end of the tube 37. If spirit does not flow initially after the tank has been clipped into place, the tank can be tilted upwards so that the level of spirit therein is above the level of the tubes but below the level of the sealing cap, and the sealing cap unscrewed for a short time so that both tubes 42 and 43 from the tank are filled with spirit when the sealing cap is again screwed into place. The operation of the constant head device will then be self-maintained.

A roll 72 of marker paper is mounted in the U-shaped slots 71 so that marker paper can be wound off the bottom side of the roll. The cam levers 28 are then raised to a position in which the flats on the cam plates 21 are in contact with the cam arms 13, 14, which causes the two rollers 6, 7 and the moistening wheel 5 to separate. A length of marker paper is drawn off the roll 72, passed between the moistening wheel 5 and lower roller 6, round the guide roller 32 and back between the upper and lower rollers 7 and 6. The end of the marker paper is drawn off through the space between the take-up spool 45 and the marker paper roll 72.

The master copy paper on which the pattern it is desired to duplicate has been outlined by means of a suitable copying pencil, has previously been wound onto a feed spool 54 with the outline facing outwards. This spool is clipped into place in between the centre pin 66 and dog pin 64 and a length of master copy paper is drawn downwards, between the upper and lower rollers 7 and 6 and onto a take-up spool 45 fitted between the centre pin 55 and dog pin 56. In order to facilitate securing the master copy to the take-up spool 45, the master copy can be tapered to a central point at its end, which can then be threaded through a centrally disposed slot (not shown) in the spool in known manner. The slot could be formed for example by centrally securing a strip of thin material at its ends to the circumference and longitudinally of the spool. Similar securing means can also be provided on the feed spool 54.

The cam levers 28 are then lowered and the rollers 6, 7 and moistening wheel 5 coact with one another so that on turning the handle 80 to rotate the lower roller 6 in the direction indicated in Fig. 1, the moistening wheel 5 and the upper roller 7 will also rotate. This causes marker paper to be drawn between the lower roller 6 and the moistening wheel 5 so that the marker paper becomes moistened with spirit, whereon the marker paper passes round the guide roller 32 and between the lower and upper rollers in contact with the outlined surface of the master copy 70.

The pulley drive 69 to the take-up spool 45 ensures that the master copy does not sag onto the marker paper being drawn off between the take-up spool 45 and the marker paper roll 72, which if sagging should occur might result in blurring the copy on the marker paper. Furthermore, should operation of the machine suddenly cease, the marker paper roll will be brought to rest quickly by means of the brake shoes 73 bearing against it.

In making a print of the master copy, it is wound completely onto the take-up spool 45. Should further prints be required, the take-up spool and the feed spool are interchanged, the take-up spool being first turned through 180° before being inserted between the centre pin 66 and dog pin 64. This is necessary because if the take-up spool were not turned, the marker would be drawn from the left hand side of the take-up spool when it was inserted in its mounting with the result that the outline thereon would face the upper roller as the master copy passed round it. It is preferred to adopt this procedure of interchanging the take-up spool and feed spool instead of separating the rollers and rewinding the master copy onto the feed spool (for example, this could be effected by providing a reverse free wheel drive for the take-up spool), since if the master copy is long, it is a quicker procedure, and furthermore, if the rewind procedure were adopted, there would always be the possibility that the master copy would drop into contact with the moist marker paper during rewinding to cause blurring of the outline of the master copy.

The possibility of locating the take-up spool between centre pin 66 and dog pin 64 after the spool has been turned through 180° is provided by forming each end plate of the spool so that it can be located by a centre pin or a dog pin. The restraint mechanism on dog pin 64 operates in such a way that when the dog pin is caused to rotate by the master copy being unwound therefrom, the rotation is transmitted to backing member 63 by collar 93 and grub screw 92. Rotation of the backing member and thus the dog pin is restrained by the friction disc 62 disposed between the locking member and fixed disc 51. The degree of restraint can be adjusted by adjusting the position of the collar 93, and thus the position of grub screw 92 in slot 63¹, thereby varying the compression of spring 91.

It is advantageous in a machine according to the invention to use marker paper which is as thin as possible because, for a given length, this paper is generally cheaper than heavier grades of the same type of paper. However, thin paper tends to crease more readily than thicker paper, and in the machine shown in Figs. 7 and 8 for example if the marker paper is too thin, there is a tendency for creases to develop as the moistened marker paper passes round the roller 106. It has been found that the tendency of paper to crease could be lessened by reducing to a minimum the contact of the marker paper with the moistening wheel and the lower and upper rollers. This is achieved in the machine shown in Figs. 1–6 by arranging that the marker paper passes to and from the rollers and moistening wheel substantially along planes at right angles to the plane containing the axes of the rollers and moistening wheel, and intersecting this plane at the line of contact of the two rollers, and, the line of contact of the lower roller and the moistening wheel. To this end, the left hand edge 90 of the spirit trough as shown in Fig. 1 has been raised to provide one guide for the marker paper, the other guide being the guide roller 32 having the same diameter as the lower roller and being so disposed that its axis is at the same horizontal level as the axis of the lower roller when it coacts with the moistening wheel. The edge 90 of the trough 34 is shown bent over so as to present a smooth surface to the marker paper. It is therefore possible in the machine shown in Figs. 1–6 to use thinner marker paper than in the machine shown in Figs. 7 and 8. Since the weight of the moistening wheel 5 and the rollers 6 and 7 tends to cause them to sag in the middle by a small amount, the moistening wheel and lower roller are provided with a small camber of from 2 to 5 thousandths of an inch. This aids in providing the marker paper with an even coating of spirit.

In the machines described it will be seen that the outer surface of the marker paper i.e. the surface which comes into contact with the outlined surface of the master copy, is moistened with spirit. Thus the marker paper need not necessarily be as absorbent as for machines in which the marker paper is moistened from the other surface. It has been found that S/O 20″ x 30″—18 lb. paper is particularly satisfactory for use as marker paper and master copy paper in the machine shown in Figs. 1–6.

It will be understood that the master copy will generally not have an outline on its extreme ends which will extend through the machine in the setting up conditions.

With a machine according to the invention patterns of any desired length can be duplicated quickly and simply, and in some cases it may be advantageous to prepare a master copy which carries several patterns along its length simply for convenience in storage, or where a number of copies are likely to be required within a short period of time.

Also, with this machine, it is possible to use multi-coloured master copies from which duplicates can be obtained in exactly the same time as for a monochrome duplication. Thus patterns for different sizes of the same garment can be outlined on the master copy in different colours.

It will be understood that one preferred embodiment according to the invention has been described by way of example only. A simple construction has been preferred so that the cost of the machine will be as low as possible.

Thus for example it is within the scope of the invention to provide an electric motor to drive the lower roller instead of a drive handle. Furthermore, an electric heater could be provided situated adjacent the master copy as it passes from the rollers to the take-up spool. The life of a master copy is dependent to some extent on how moist it becomes during use in the machine, especially if a plurality of markers is to be made immediately one after the other. The electric heater can be arranged to evaporate spirit in the master copy quickly whilst it is being wound towards the take-up spool.

Also, in order to obtain reasonably clear markers when the master copy has become thin, means could be incorporated above the vertical slots in the bearing frames for varying the compression of the springs which urge the two rollers together. With the machine as illustrated, it has been found possible to obtain fifty good markers and another hundred satisfactory markers from a single master copy.

A guillotine may also be provided on the machine for cutting the marker paper.

The machine as illustrated is suitable for producing markers of up to 40 ins. in width. The rollers should be several inches longer than the width of the master copy so that no account need be taken of any small errors in aligning the marker paper or master copy whilst the machine is being set up. For wider master copies of say 60 ins. in width, special precautions have to be taken against sagging of the rollers. Thus for example, an arcuate frame of needle bearings could be provided in the spirit trough to support the moistening wheel at the centre between the bearing frames, which arcuate frame would be so disposed and arranged that it would not interfere with the moistening action of the wheel.

Alternatively, the master copy could be cut down the longitudinal centre line to give two master copies of half the width which would be duplicated separately in the machine as illustrated.

It will be understood that the expression "marker paper" has its main significance with reference to the garment trade. However, it is not intended to limit the scope of the invention by the use of this expression, which can be defined as any paper suitable for receiving an outline from a master copy in a spirit duplicating machine according to the invention. For example, the machine could be used for reproducing prototype plans for use in the aircraft industry, since in this industry also, plans of great length are frequently required.

We claim:

1. A spirit duplicating machine comprising a support, a pair of rollers having spindles projecting from their ends, bearing means for the spindles slidably mounted on the support for rotatably supporting the rollers one above the other in contacting relation, a moistening wheel mounted on the support for engagement with the lower roller, means for moistening the surface of the moistening wheel with spirit so that marker paper fed between the lower roller and the moistening wheel will be moistened thereby prior to being fed back between the lower and upper rollers, a feed spool and a take-up spool for a master copy, said spools being rotatably mounted about axes parallel to the axes of said rollers, means for driving the take-up spool so as to rotate it at substantially the same circumferential speed as the rollers, the take-up spool serving in operation to wind on a master copy after it has been unwound from the feed spool and fed in contact with moistened marker paper between said rollers.

2. A spirit duplicating machine in accordance with claim 1 and including resilient biasing means urging said rollers into engagement with each other and the lower roller into engagement with the moistening wheel.

3. A spirit duplicating machine comprising two co-acting rollers, means individual to the rollers for rotatably supporting them one above the other, a moistening wheel engageable with the lower roller, cam means engageable with the supporting means to effect separation of the lower roller from the moistening wheel, drive means for said rollers, mounting means for a supply of marker paper, means for moistening the surface of the moistening wheel with spirit so that marker paper fed between the lower roller and the moistening wheel will be moistened thereby prior to being fed back between the lower and upper rollers, a feed spool and a take-up spool for a master copy, said spools being rotatably mounted about axes parallel to the axes of said rollers, means for driving the take-up spool so as to rotate it at substantially the same circumferential speed as the rollers, the take-up spool serving in operation to wind on a master copy after it has been unwound from the feed spool and fed in contact with moistened marker paper between said rollers.

4. A spirit duplicating machine as claimed in claim 3 in which said cam means comprises two cam arms disposed at each side of the machine respectively beneath the roller supporting means, said cam arms being so pivotally mounted that the weight of the rollers tends to close the remote ends of the cam arms together, and a rotatable cam plate disposed between the remote ends of each pair of cam arms, the cam plate being so shaped that upon rotation it moves the cam arms and causes the rollers to separate from each other and the lower roller to separate from the moistening wheel.

5. A spirit duplicating machine as claimed in claim 3 in which said cam means comprises a pivotally mounted cam frame having arcuate slots therein, the roller supporting means projecting at each side of the machine into the arcuate slots in said cam frame, the latter serving in operation, when it is rotated about its pivot, to cause the rollers to separate from each other and the lower roller from the moistening wheel.

References Cited in the file of this patent

UNITED STATES PATENTS

| | | |
|---|---|---|
| 377,583 | Stiles | Feb. 7, 1888 |
| 1,096,055 | Pugh | May 12, 1914 |
| 2,269,086 | Morris | Jan. 6, 1942 |
| 2,340,819 | Mills | Feb. 1, 1944 |
| 2,663,253 | Sauerman et al. | Dec. 22, 1953 |

FOREIGN PATENTS

| | | |
|---|---|---|
| 1,030,784 | France | June 17, 1953 |

UNITED STATES PATENT OFFICE

CERTIFICATE OF CORRECTION

Patent No. 2,903,963                                                           September 15, 1959

Norman Harris et al

It is hereby certified that error appears in the printed specification of the above numbered patent requiring correction and that the said Letters Patent should read as corrected below.

Column 11, line 25, after "effect separa-" insert -- tion of the rollers from one another and separa- --; column 12, line 23, after "moistening wheel." add the following claims:

6. A spirit duplicating machine comprising two coacting rotatably mounted rollers, mounting means for a supply of marker paper, a moistening wheel, the axes of said rollers and moistening wheel lying in a vertical plane, the moistening wheel being lowermost and coacting with the bottom roller, means for moistening the surface of the moistening wheel with spirit so that marker paper fed between the lower roller and the moistening wheel will be moistened thereby, a guide roller which is rotatably mounted parallel to and at the same horizontal level as the lower roller, the lower roller and the guide roller having the same diameter so that moistened marker paper may pass from between the lower roller and the moistening wheel, round the guide roller, and back between the lower and upper rollers making first contact with them substantially at the line of contact of the two rollers, a feed spool and a take-up spool for a master copy, which spools are rotatably mounted about axes parallel to the axes of said rollers, means for driving the take-up spool so as to rotate it at substantially the same circumferential speed as the rollers, the take-up spool serving in operation to wind on a master copy after it has been unwound from the feed spool and fed in contact with moistened marker paper between said rollers.

7. A spirit duplicating machine as claimed in claim 6 in which the moistening wheel is disposed in a spirit tank incorporating a constant head device for maintaining the level of spirit in the tank above the bottom of the moistening wheel.

In the heading to the printed specification, line 8, for "5 Claims." read -- 7 Claims. --.

Signed and sealed this 5th day of April 1960.

(SEAL)
Attest:

KARL H. AXLINE
Attesting Officer

ROBERT C. WATSON
Commissioner of Patents